April 19, 1955     S. BOWMAN     2,706,624
ROTARY CUTTER ARM

Filed Jan. 25, 1954                           2 Sheets-Sheet 1

INVENTOR.
SPENCER BOWMAN
BY
ATTORNEY

April 19, 1955 S. BOWMAN 2,706,624
ROTARY CUTTER ARM
Filed Jan. 25, 1954 2 Sheets-Sheet 2
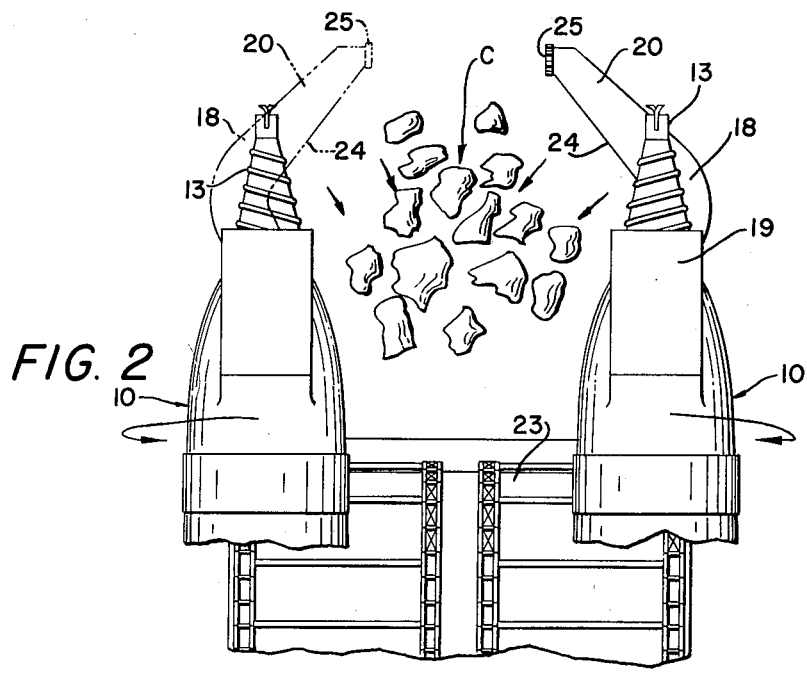
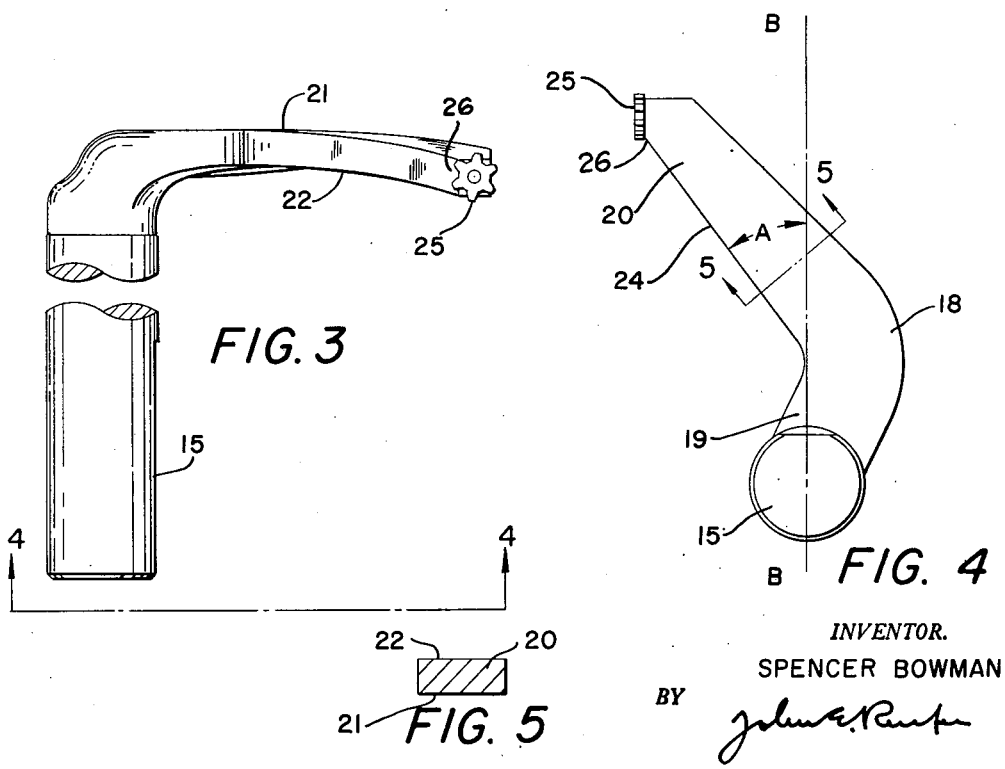
INVENTOR.
SPENCER BOWMAN
BY
ATTORNEY

United States Patent Office 2,706,624
Patented Apr. 19, 1955

2,706,624

ROTARY CUTTER ARM

Spencer Bowman, Bay Village, Ohio, assignor, by mesne assignments, to Westinghouse Air Brake Company, a corporation of Pennsylvania Application January 25, 1954, Serial No. 405,888

7 Claims. (Cl. 262—26)

This invention relates broadly to a coal mining machine of the rotary cutting head type, but more particularly to a cutter arm used in conjunction with such cutting head.

In a mining machine of the rotary cutting head type, there is generally provided a plurality of cutting heads mounted side by side on the forward end of the machine. These heads are spaced laterally and generally each includes a burster element intended to penetrate into the face of the coal being mined and gradually break the coal radially. Revolving with this burster element in offset relationship therewith, there is a cutter blade which extends longitudinally of the head, and parallel with the rotary axis of the burster. This cutter blade carries removable cutters adapted to cut a circular kerf into the face of the coal being mined, which kerf severs the radially broken coal from the face. In order to remove the loose or made up coal from the bottom of the face, the mining machine is also provided with a conveyor which extends longitudinally of the machine from one end to the other. Scraper blades or gathering devices mounted on the forward end of the machine are generally provided to load the loose coal on the intake end of the conveyor.

Heretofore, it was customary to use cutter blades having straight leading edges extending parallel with the rotary axis of the head or its burster element, thereby causing the loose coal accumulated at the bottom of the face to be beaten or churned by the cutter blades during their rotation through the coal, with the result that before the coal could be removed by the conveyor, it was practically pulverized by the churning action of the cutter blades.

It is therefore the primary object of this invention to provide an improved cutter blade, which, while adapted to cut the usual circular kerf in the face of the coal, is especially shaped to sweep the loose coal from the bottom of the face being mined, thereby preventing the blade from exerting any churning action causing the pulverization of the coal.

Another object of this invention is to produce such a cutter blade which will prevent accumulation of loose coal at the bottom of the face being mined.

Another object of this invention is to produce an improved cutter blade for a coal mining machine of the rotary cutting head type, which is of simple and strong construction, capable of withstanding the relatively high cutting thrust to which it is subjected.

Other objects of this invention will be apparent from the following detailed description wherein similar characters of reference designate corresponding parts, and wherein:

Figure 2 is a diagrammatic sketch illustrating the invention in practical operation.

Figure 3 is an enlarged side elevational view of the improved cutter arm.

Figure 4 is a top plan view of the improved arm, and

Figure 5 is a cross-sectional view taken on line 5—5 in Figure 4.

Figure 1:
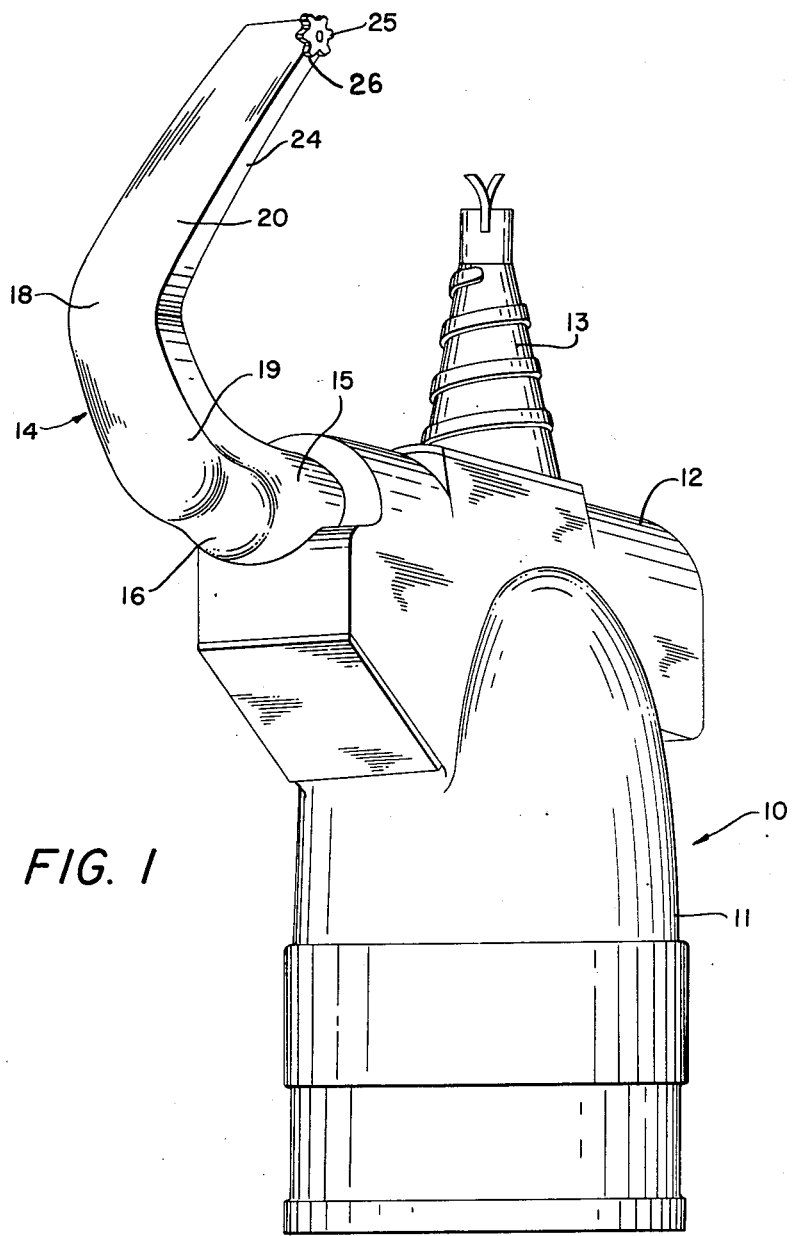
Figure 1 is a side elevational view of a rotary cutting head embodying the invention.

Referring to the drawings, 10 designates generally a rotary cutting head, which, except for the improved cutter arm shown therein, is of the usual type used in continuous coal mining machines. In practice, each machine is equipped with a plurality of such heads mounted side by side on the front end of the machine. Each head includes a cylindrical casing 11 having its lower end, as seen in Figure 1, operatively connected to the machine, not shown. Within the casing 11 is preferably mounted a gear transmission through which rotary motion is translated from the machine to the head at the desired speed and direction. The other end of casing 11 is formed by a transversal section 12 having fixed thereto for rotation therewith a burster element 13, which extends longitudinally therefrom coaxially with the rotary axis of the head 11.

Referring now more particularly to the invention, 14 designates generally the improved cutter arm, which consists of a cylindrical shank 15 adapted to fit in the transversal section 12 of the head 10, wherein it is secured by any suitable means such as shown and described in the co-pending application, by the same inventor, Serial No. 355,073, filed May 14, 1953. Means may also be provided within section 12 for moving the shank 15 in and out to vary the diameter of the kerf intended to be cut by the blade. Shank 15 has its outer end 16 protruding from section 12, and as an integral part thereof, has a blade 18 extending at right angles therefrom. This blade extends longitudinally ahead of of the cutting head 10 for rotation therewith in offset but parallel relation with its rotary axis. It is of a length calculated to engage the face of the coal being mined concurrently with the outer end of the burster element 13. Blade 18 is of substantially rectangular cross-section, it is of greater width than thickness and extends widthwise transversally of its shank 15. At its inner end, blade 18 is of a width substantially equal to the diameter of its shank, which width is gradually reduced to about one-half that diameter.

As viewed in Figure 4, that is, from the free end of the shank 15, blade 18 has an inner end portion 19 extending radially from the shank 15, and an outer portion 20 extending from the inner portion 19 at an inside or opened angle A of approximately 40° with line B—B, which line is parallel to the longitudinal center axis of the machine. The inner portion is substantially shorter than the outer portion with the vertex of the angle A located within the one-half portion of the blade 18 adjacent the shank 15. In practice, the inner portion is not intended to enter the kerf cut by the outer portion.

In order to operate within the kerf cut by the blade without interference or binding of its trailing edges, the outer or working portion 20 of the blade 18 has its upper and lower sides 21 and 22 which denote its width, shaped to correspond substantially to the outer and inner side walls of the kerf intended to be cut thereby. Since the diameter of the kerf is variable, it is advisable to shape the upper side 21 to correspond to the outer side wall of the smallest diameter kerf intended to be cut, and its under side 22 to the inner side wall of the kerf of the largest diameter. With the upper and lower sides 21 and 22 thus extending widthwise substantially circumferentially with respect to the axis of rotation of the blade, the blade trailing edges will always clear the side walls of the kerf irrespective of its size within predetermined limits.

In practice, coal mining machines of the rotary cutting head type with which the above described cutter arm is intended to be used, are generally equipped with a conveyor, the front or intake end 23 of which is shown in Figure 2. The intake end of the conveyor is located in the center of the front end of the machine and is inclined toward the ground to facilitate the loading of the loose coal thereon, which loading is effected by any suitable gathering devices. Such mining machines are also equipped with a plurality of cutting heads, two of which are shown in Figure 2, mounted side by side, with each adjacent heads preferably rotated in opposite directions.

The important feature of this invention is to have the open angle A provided within one of the sides of the blade denoting its thickness, always facing in the direction of rotation of the blade, thereby resulting in that side 24 of the blade to become its leading side with respect to the direction of rotation of the blade. As customary in cutter blades of this general type, removable cutters 25, one of which is shown in Figure 1, are secured to the leading side of the blade.

In practice, blade 18 is preferably fixed to the head 10 so that a straight line, such as B—B in Figure 4, passing through its free end and the center of the shank 15, is substantially parallel to the longitudinal center axis of the machine and preferably perpendicular to the face of the coal intended to be mined.

During operation, upon rotation of the heads 10 and axial thrust imparted thereto by the forward travel of the machine, the burster element 13 will gradually penetrate into the coal and cause it to break radially up to the circular kerf cut by the heading side 24 of the blade, or more particularly by the cutters 25 carried thereby. Since the cutting operation is being performed in the usual manner, no further explanation is thought necessary, other than pointing out that the cut coal falls and generally accumulates at the bottom of the face being mined as illustrated by C in Figure 2. Heretofore with blades having leading sides parallel to their rotary axes, the blades, during their rotation through the loose coal, would do no more than churn the coal in a pulverizing manner before it could be loaded on the intake end of the conveyor 23 by suitable gathering or loading devices. With the improved blade 18, the leading side 24 always extends from its foremost end 26 rearwardly with respect to its direction of rotation, thereby causing it to contact the loose coal angularly as shown in Figure 2, and sweep it away from the face being mined out of the path of the next travel of the blade. The contact angle of the blade with the coal varies as the blade swings through the loose coal, but the resulting force is always in a direction tending to move the coal away from the face as indicated by the small arrows in Figure 2. While the present improved blade is not intended to replace any coal gathering device usually used to load the coal on the intake end of the conveyor, it will be understood that in addition to moving the loose coal away from the face and preventing its pulverization, the loose coal is also brought closer to the front end of the machine and more readily swept by the gathering device on the intake end of the conveyor.

It has been calculated that best results would be obtained with an angle A of 45°, but due to the difficulty encountered in providing clearance for the trailing edges of the blade with respect to the side walls of the kerfs of small and large diameters, the best practical angle has been found to be one of about 40°.

From the foregoing, it will be understood that the invention, while providing the usual kerf cutting means, also provides very simple and efficient means for automatically moving the loose coal from the face being mined, thereby assisting in the loading of the coal on the intake end of the conveyor as well as preventing churning and pulverization of the loose coal.

While the preferred form of the invention has been shown and described, it is to be understood that variation in detail and form may be made without departure from the invention.

I claim:

1. A cutter arm of the type described including a shank, a blade integral at one end with said shank being of greater width than thickness and extending widthwise laterally of said shank, said arm being susceptible of rotation on an axis perpendicular to said shank, one of the sides of said blade denoting its thickness constituting an open angle shaped leading side with respect to the direction of rotation of said blade.

2. A cutter arm according to claim 1, wherein the vertex of the open angle is located within the one-half portion of said blade adjacent said shank.

3. A cutter arm of the type described including a shank, a blade integral at one end with said shank being of greater width than thickness and extending widthwise laterally of said shank, said arm being susceptible of rotation on an axis perpendicular to said shank, one of the sides of said blade denoting its thickness constituting the leading side with respect to the direction of rotation of said blade, the major portion of said leading side being inclined from its free foremost end rearwardly thereof relative to the direction of rotation aforesaid.

4. A cutter arm of the class described comprising a shank, a blade integral with said shank extending at right angles therefrom, said arm being susceptible of rotation on an axis offset from but parallel to said blade, and a side on said blade inclined first rearwardly from a leading end and then forwardly to said shank with respect to the direction of said rotation.

5. A cutter arm of the class described comprising a shank, a blade of greater width than thickness integral with said shank at right angles therewith, said arm being susceptible of rotation in one direction on an axis offset from but parallel to said blade, said blade extending widthwise circumferentially with respect to said axis and having an inner portion connecting to said shank and an outer portion extending angularly ahead of said inner portion with respect to the direction of rotation aforesaid.

6. A kerf cutting blade having inner and outer portions, means on said inner portion through which said blade is adapted to be fixed on a rotary support for rotation therewith in one direction, said blade being of greater width than thickness and extending widthwise circumferentially with respect to the axis of said rotation, the outer portion of said blade extending angularly ahead of said inner portion with respect to the direction of rotation aforesaid.

7. A cutter arm including a blade subjected to be fixed to the rotary cutter head of a mining machine for rotation therewith about an axis substantially parallel to said blade, the leading side of said blade with respect to the direction of said rotation having its outer end portion ahead of its inner end portion.

References Cited in the file of this patent

UNITED STATES PATENTS 2,657,916     Von Stroh _____ Nov. 3, 1953